Sept. 2, 1958     K. B. KILBORN     2,850,241

PRODUCTION COUNTER ACTUATING APPARATUS

Filed Oct. 29, 1953     2 Sheets-Sheet 1

INVENTOR.
KARL B. KILBORN

BY

*R. L. Miller*
ATTORNEY

Sept. 2, 1958  K. B. KILBORN  2,850,241
PRODUCTION COUNTER ACTUATING APPARATUS
Filed Oct. 29, 1953  2 Sheets-Sheet 2

INVENTOR.
KARL B. KILBORN

United States Patent Office 2,850,241
Patented Sept. 2, 1958

2,850,241

PRODUCTION COUNTER ACTUATING APPARATUS

Karl B. Kilborn, Akron, Ohio, assignor, by mesne assignments, to The Goodyear Tire & Rubber Company, a corporation of Ohio Application October 29, 1953, Serial No. 389,045

8 Claims. (Cl. 235—92)

This invention relates to apparatus for attachment to a machine for making articles which actuates a production counter in such a manner that the count will register only the actual number of articles manufactured on the machine.

Since machine operators are frequently paid a fixed amount for each article which they produce, it is important to accurately count the total number of articles actually produced. Various mechanical and electrical production counter actuating means are known. However, these actuators frequently permit unscrupulous machine operators to turn the counter by hand or otherwise trip the counter actuating means.

Production machines for manufacturing sundry articles perform a cycle or plurality of operations in a predetermined sequence. The counter actuating means of this invention may be readily attached to such machines and receives electrical impulses from the machine corresponding to the performance of pre-selected operations on the machine a predetermined time interval apart. However, the counter is not actuated until all of the operations of the cycle are performed in their proper sequence.

An object of this invention is to provide a counter actuating means which cannot be manipulated to falsify the number of articles produced on the machine and is tamper-proof in operation.

A further object of this invention is to provide a means for actuating a counter which will count the number of articles actually manufactured on the machine, and at the same time allow for replacing defective or partially manufactured articles without affecting a count.

Another object of this invention is to provide a means for actuating a counter for automatically determining the number of articles actually produced on a machine for a given period of time and which is particularly characterized by its simplicity in construction, economy of operation and ease of installation.

Other objects and advantages of the invention relating to the particular arrangement and construction of the various parts will become apparent as the description proceeds.

Fig. 1 of the drawings is a side elevation with parts broken away showing the counter and counter actuating apparatus of the present invention.

Figure 1:
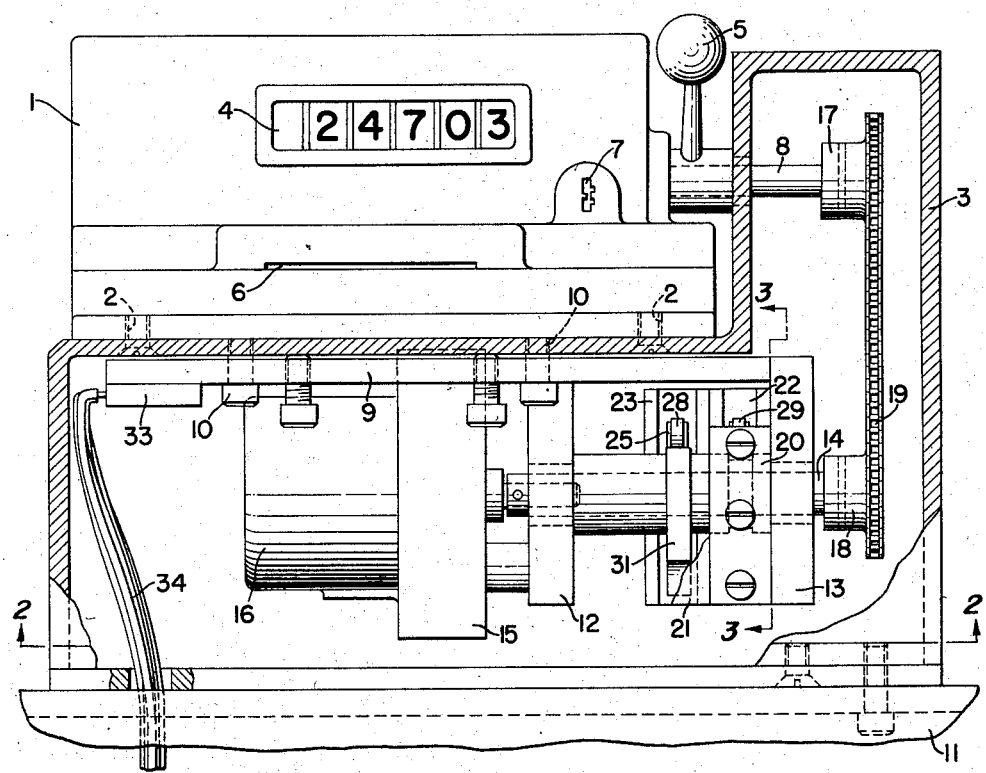

Referring to Fig. 1 of the drawings, a commercial counter 1 is secured by means of screws 2 to the housing 3 which encloses the counter actuating apparatus of the present invention. The counter 1 is provided with a visual meter 4 and a printing actuating lever 5. A card may be inserted into the slot 6 whenever a printed record of the reading upon the meter 4 is desired to be made. Actuation of the lever 5 will cause the visual count to be recorded on the inserted card. The counter 1 is also provided with means to re-set the counter to zero by insertion of a key into the lock 7.

The counter 1 is actuated by rotation of the shaft 8. One revolution of the shaft 8 increases the reading on the meter 4 by one. The counter actuating apparatus is provided with a base plate 9 secured by screws 10 to the housing 3. The housing in turn is bolted to the production machine 11. It is thus seen that the counter and counter-actuator mechanism are inaccessible except from internally of the production machine 11.

Plates 12 and 13 are bolted or otherwise secured to the plate 9. Shaft 14 is journalled in the plates 12 and 13. The shaft 14 is driven by a motor 16 through the reduction gears in the housing 15, the motor 16 being bolted to the housing 15 which in turn is fastened to the plate 12. The outer ends of the shafts 8 and 14 are provided with sprockets 17 and 18 respectively, the latter driving the former by means of a chain 19.

Switches 20, 21, 22 and 23 are bolted in pairs diametrically opposite the shaft 14 to the plate 13. Each of the switches is provided with an actuator 25. The actuator 25 for the switches 21 and 20 is provided with rollers 26 and 27 which are axially aligned. The switches 22 and 23 are provided with rollers 28 and 29 which are likewise axially aligned, the rollers 26 and 29 being disposed within a plane transverse of the shaft 14 and axially displaced from rollers 27 and 28 respectively. Cams or trip arms 30 and 31 secured to shaft 14 are circumferentially displaced and rotate in planes such that the inclined surface 32 of each trip arm or cam respectively contacts the rollers 26—29 and 27—28 once during each revolution of shaft 14.

Figure 4:
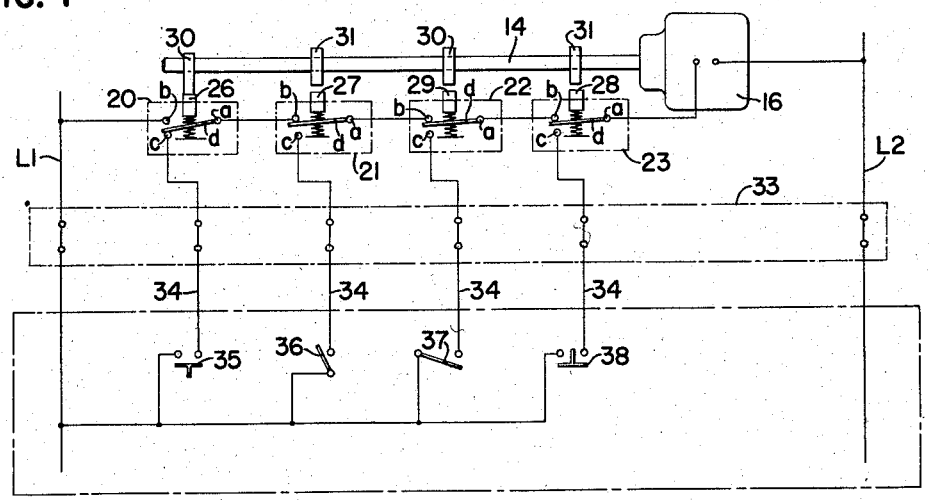
Fig. 4 shows diagrammatically the control circuit for the counter actuating apparatus.
Figure 2:
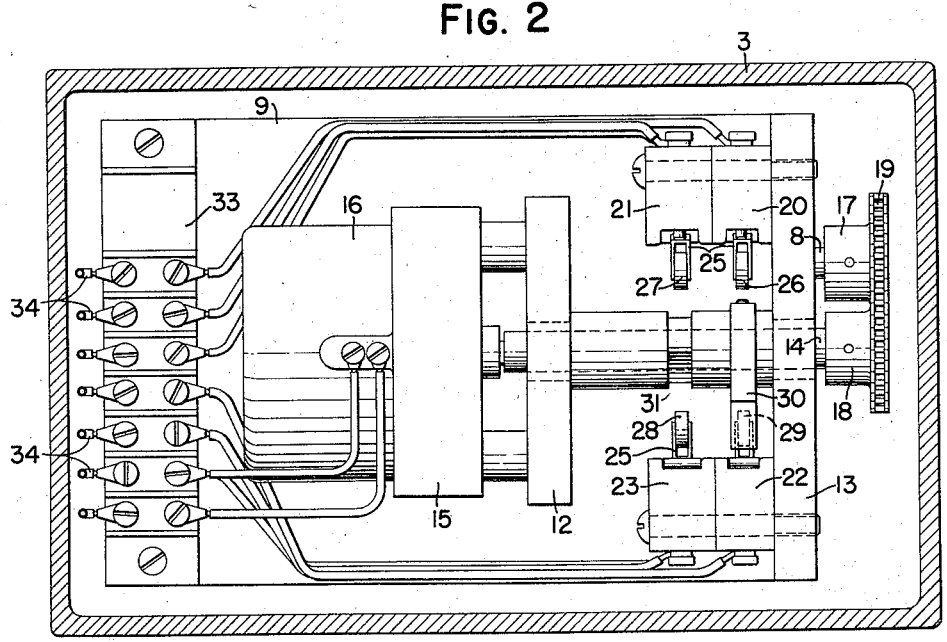
Fig. 2 is a cross-sectional view taken along the lines 2—2 of Fig. 1.
Figure 3:
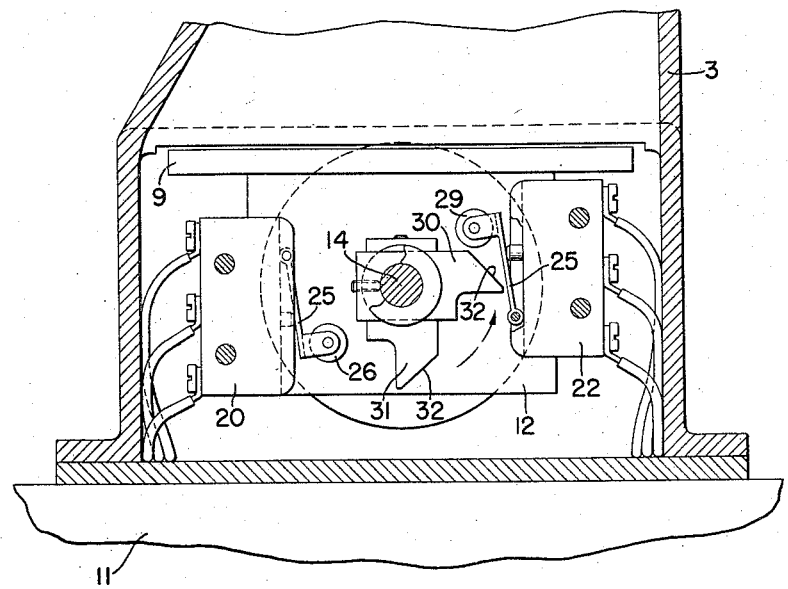
Fig. 3 is a cross-sectional view taken across the lines 3—3 of Fig. 1.

Each of the switches 20, 21, 22 and 23 are provided with three contacts a, b and c with contacts a connected to contact b of the next succeeding switch in the series except for contact b of switch 20 which is connected to line L1 and contacts a of switch 23 which is connected to the motor 16, as shown in Fig. 4. The contact arm d of switches 20 through 23 are normally in closed position across contacts a and b with the normally open contacts c and line lead L1 and L2 connected to the terminal panel 33.

The contacts c are connected by leads 34 through the terminal panel 33 to switches 35 through 38 mounted on the interior of the production machine 11. Each of the switches 35 through 38 is closed by the initiation or termination of one of the series of operations or steps in the manufacture of the particular product being produced on the machine 11. For example, if the counter actuating apparatus is attached to a tire building machine, the switch 35 is a push button which is closed by the machine operator to cause the tire building drum to be expanded. Switch 36 is a solenoid activated switch which is energized to close switch 36 when the mandrel is rotated. Switch 37 is a limit switch closed when the stitcher tool is actuated and switch 38 is a push button switch closed to contract the mandrel. In other words, the leads 34 are connected to a plurality of switches on the production machine 11 which are closed in a sequence corresponding to the sequence of critical operations necessary to manufacture the product which is being counted.

Assuming that the operator of the production machine is beginning a cycle of operations necessary to produce an article in which four operations are critical, the cam 30 will be initially in contact with roller 26 of switch 20. When the switch 35 is actuated to perform the first critical step, the motor 16 is energized through switch 35, line 34, and switches 20 through 23. The motor 16 is energized in this manner until cam 30 rotates past the roller 26 of switch 20 at which time the contact arm d of switch 20 snaps back into its normal position to instantaneously open the switch 20 across contacts *a* and *c* and close switch 20 across contacts *a* and *b*. Since the arm *d* of switch 20 moves into its normally closed position instantaneously, the motor continues to rotate but is energized across the contacts *b* and *a* of switches 20 through 23. The motor remains energized until the shaft 14 is rotated about 90 degrees or until cam 31 bears against roller 27 to cause arm *d* of switch 21 to open the circuit across contacts *a* and *b* of switch 21 and close the circuit to the normally open switch 36. The motor 16 will remain de-energized until the operator performs the next critical operation which is controlled by switch 36 at which time an electrical impulse again energizes motor 16 through contacts *c* and *a* of switch 21 and contacts *b* and *a* of switches 22 and 23. The motor 16 will rotate the shaft 14 until cam 30 contacts roller 29 of switch 22 and engages the actuating arm 25 and forces the contact arm *d* thereof into contact with contacts *a* and *c* to de-energize the circuit to the motor 16. The motor 16 remains de-energized until switch 37 is closed by the performance of the next critical step in the sequence of operations and an impulse is sent through contacts *c* and *a* of switch 22 to maintain energization of motor 16 until cam 31 contacts roller 28 to open switch 23. When switch 38 is actuated by the operator the motor again becomes energized through line 34 and contacts *c* and *a* of switch 23. Motor 16 will rotate until cam 30 contacts roller 26 of switch 20 and causes contact arm *d* to bridge contacts *a* and *c* thereof. The counter actuating apparatus is then in normal starting position and it is seen that shaft 14 has been intermittently rotated 360 degrees to actuate the counter one unit.

Although the present invention has been described above in reference to a tire building machine, it is obvious that the counter actuating apparatus may be used to count the production of other machines which are used to produce sundry articles by a predetermined sequence of operations. Furthermore, it is apparent that the leads 34 may be connected to terminals of existing limit switches, solenoid switches, push button switches, etc. corresponding to switches 35 through 38, or corresponding switches may be added to the production machine so that they are actuated in the proper sequence.

From the foregoing detailed description it is apparent that the present invention provides an economical counter actuating unit which can easily be secured to a production machine so that the mechanism thereof is inaccessible to the machine operator. It is seen that the mechanism cannot actuate the counter unless all of the switches 35 through 38 are actuated in their proper sequence. Thus, if the operator should attempt to fraudulently trip the counter by omitting a step controlled by switch 37, while performing the step controlled by switch 38, the motor 16 will remain de-energized and no count will be registered. It is also seen that the counter will likewise not be advanced if an article on the production machine is removed before it is completed because of a defect.

It is to be understood that the present invention is in no way limited to the specific number of cam-operated switches or machine-operated switches illustrated in the description and drawings. Obviously the number of times the shaft 14 is advanced and stopped may be varied by increasing or decreasing the number of switches so long as the proper sequence of actuation corresponding to the sequence of performing the steps or machine operations necessary to produce the article is maintained. The number of switches may be equal to the number of machine operations necessary to produce the product but this is not usually economically feasible, nor is it necessary, since the operator cannot readily learn the critical steps which cause the switches 35 through 38 to be actuated.

While certain representative embodiments and details have been shown for the purpose of illustrating the invention, it will be apparent to those skilled in this art that various changes and modifications may be made therein without departing from the spirit or scope of the invention.

I claim:

1. An apparatus for counting articles manufactured by a plurality of operations on a machine comprising a counter, a motor, means to actuate the counter including a shaft driven by said motor, an article production machine, a plurality of switch means closed respectively by movement of an element on the production machine during the performance of one of a predetermined number of operations in the production cycle of said machine, a plurality of second switches one of which is associated with each switch means, and means driven by said shaft for actuating said second switches sequentially, said second switches initially connected in series to said motor with the first of the series of said second switches connected in series to its associated switch means whereby closing of said switch means energizes said motor to rotate said shaft until the next succeeding second switch of the series is disconnected by said actuating means from said series and connected to its associated switch means, said motor being de-energized until the said associated switch means is closed.

2. An apparatus as claimed in claim 1 in which the means for actuating said second switches includes a plurality of cams, one of which is associated with each respective second switch.

3. An apparatus for counting articles manufactured by a plurality of operations on a machine comprising a counter, an article production machine, a motor, a plurality of switch means closed respectively by movement of an element on the production machine during the performance of one of a predetermined number of operations in the production cycle of said machine, a plurality of second switches each having a normally open and a normally closed contact and a switch arm, one of said normally open contacts being connected respectively with one of said switch means, means powered by said motor for actuating said switch arms sequentially from the normally closed to normally open contact, all but the first of said switch arms being initially connected in series to said motor with the said first switch arm connected across its normally open contact, whereby closing of the switch means, associated with said first switch arm, energizes said motor and powers said actuating means to move the switch arm of the next succeeding second switch from the normally closed to the normally open contact of the said next succeeding switch, said motor being de-energized until the switch means connected to the next succeeding second switch is closed, and means controlled by said actuating means for advancing said counter in response to sequential actuation of all of said second switches.

4. An apparatus as claimed in claim 3 in which the means powered by said motor for actuating said switch arms includes a plurality of cams one of which is associated with each respective second switch.

5. An apparatus as claimed in claim 4 in which said cams are secured to a shaft driven by said motor.

6. An apparatus for counting articles manufactured by a plurality of operations on a machine comprising, in combination, a counter, an article production machine, a motor, a source of power connected to and for energizing said motor, a first plurality of switch means each being actuated by an element associated with one of said plurality of operations of the machine, each of said switch means being series connected to said power source and one of a plurality of second switch means, said plurality of second switch means initially connected to said power source in series with each other and said motor, and each disconnectable from said series arrangement and connectable to its associated first switch means, means driven by said motor for actuating said plurality of second switch means to disconnect each switch in sequence from said series arrangement and connect it to its associated first switch means and said actuating means being so constructed and arranged to disconnect the first of said second switch means from said power source and connect it to its associated first switch means at the commencement of said plurality of operations of said machine whereby closing of said associated first switch means energizes said motor and thereby drives said actuating means until the next succeeding second switch means is disconnected from the preceding second switch means and connected to its associated first switch means so that said motor is de-energized until said associated first switch means is closed, and means to operate said counter responsive to the energizing of said motor after sequential operation of said plurality of second switches to register the completion of said plurality of production operations.

7. An apparatus as claimed in claim 3 in which the means driven by said motor for actuating said plurality of second switch means includes a plurality of cams one of which is associated with each respective second switch means.

8. An apparatus as claimed in claim 7 in which said cams are secured to a shaft driven by said motor.

References Cited in the file of this patent

UNITED STATES PATENTS

| | | |
|---|---|---|
| 2,209,108 | Briggs | July 23, 1940 |
| 2,256,222 | Smith | Sept. 16, 1941 |
| 2,318,372 | Caldwell | May 4, 1943 |
| 2,360,545 | Bond et al. | Oct. 17, 1944 |
| 2,425,124 | Ray | Aug. 5, 1947 |
| 2,544,895 | Nelson | Mar. 13, 1951 |
| 2,672,067 | Hansell | Mar. 16, 1954 |